Dec. 4, 1956  H. BROOKS  2,773,226
CAPACITOR
Filed Aug. 11, 1953  2 Sheets-Sheet 1

Dec. 4, 1956 H. BROOKS 2,773,226
CAPACITOR
Filed Aug. 11, 1953 2 Sheets-Sheet 2
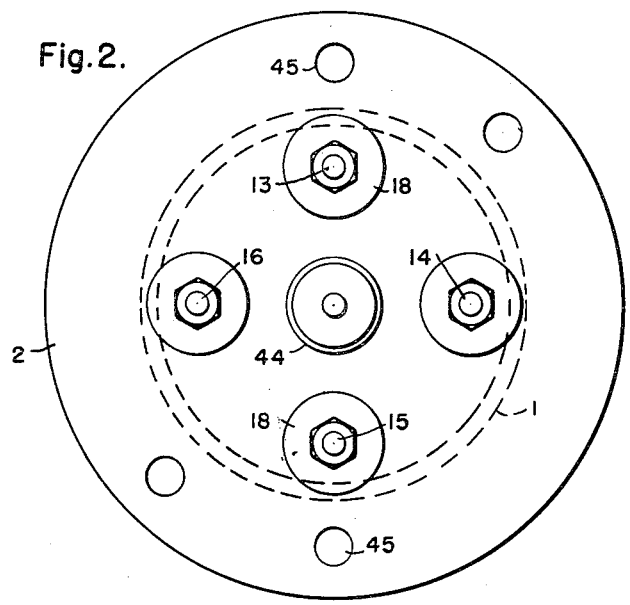
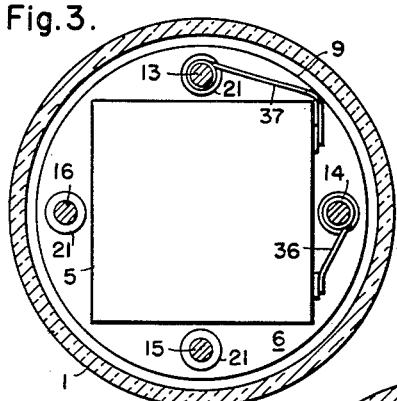
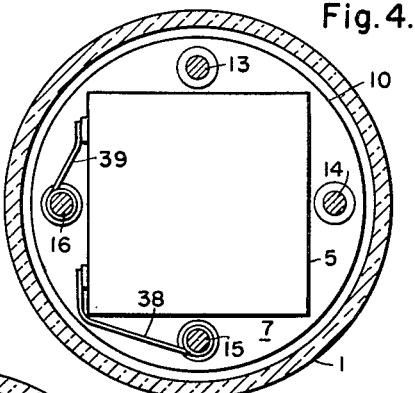
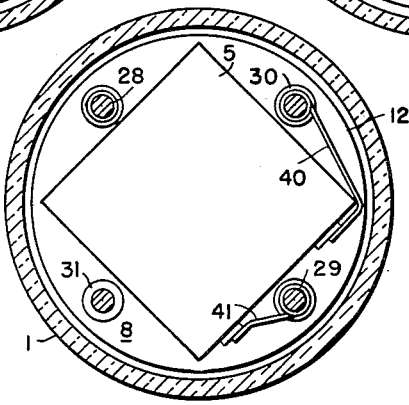
WITNESSES:
INVENTOR
Hamilton Brooks.
BY
ATTORNEY

United States Patent Office 2,773,226
Patented Dec. 4, 1956

2,773,226

CAPACITOR

Hamilton Brooks, Pittsburgh, Pa., assignor to Westinghouse Electric Corporation, East Pittsburgh, Pa., a corporation of Pennsylvania Application August 11, 1953, Serial No. 373,508

5 Claims. (Cl. 317—242)

The present invention relates to capacitors and, more particularly, to a sectionalized capacitor which is especially suitable for use as a tuning capacitor in carrier current wave traps.

Wave traps such as are used for blocking high-frequency carrier currents, to confine the carrier current to a desired line section, consist of a reactor and a capacitor, which can be tuned to block the flow of carrier current of a predetermined frequency. Capacitors intended for this service must be capable of very accurate adjustment of capacitance to permit accurate tuning, and they are usually divided into sections, or groups of individual capacitor elements, which are separately connectible for tuning the wave trap to the desired frequency. Mica capacitors have often been used for this service, but such capacitors are relatively expensive and the desired accuracy of capacitance cannot easily be obtained.

The principal object of the present invention is to provide a sectionalized capacitor in which the capacitance of each section can be individually adjusted with great accuracy.

Another object of the invention is to provide a sectionalized capacitor in which each section consists of a group of wound capacitor elements clamped together under pressure, and in which the clamping pressure on each section can be individually adjusted to adjust the capacitance of the section, together with means for effecting separate electrical connection to each section.

A further object of the invention is to provide a sectionalized capacitor comprising a plurality of groups of individual capacitor elements with clamping means for clamping the groups together under pressure, the clamping means being arranged to permit accurate individual adjustment of the clamping pressure on each group, and to permit the clamping means to be used to provide electrical connection to each group separately.

The invention will be more fully understood from the following detailed description, taken in connection with the accompanying drawing, in which:

Fig. 2 is an end view of the capacitor looking at the left hand end of Fig. 1; and Figs. 3, 4 and 5 are transverse sectional views approximately on the lines III—III, IV—IV and V—V of Fig. 1, respectively.

Figure 1:
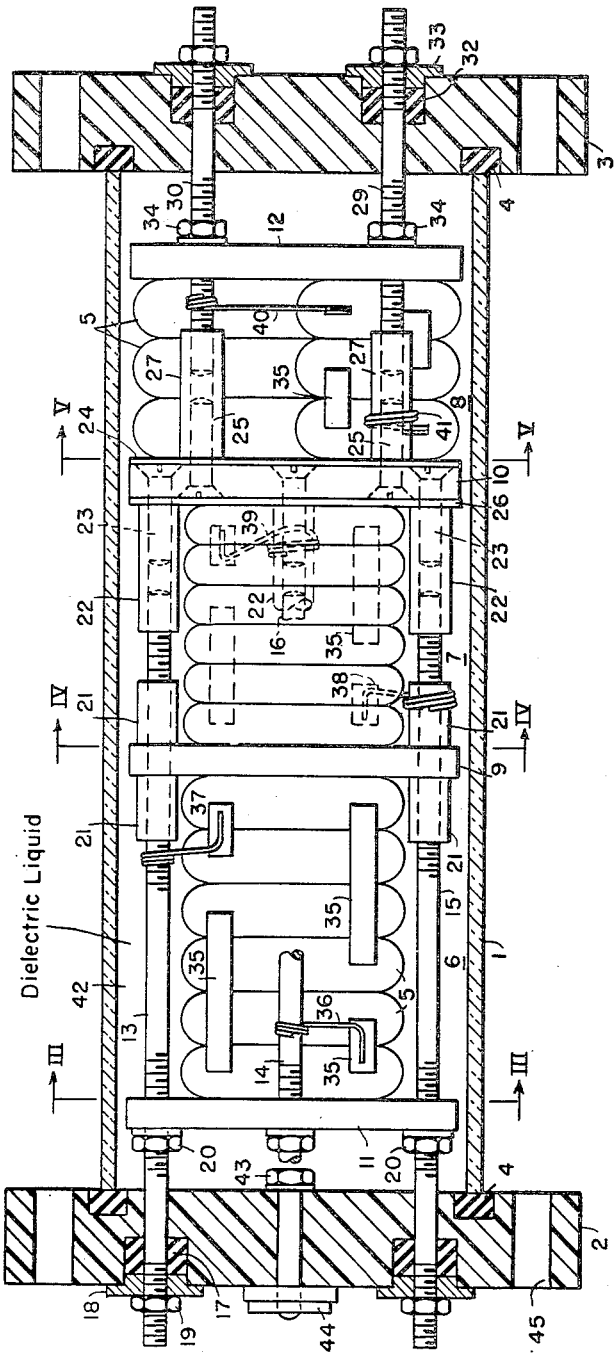
Figure 1 is a longitudinal sectional view of a capacitor embodying the invention.

In the illustrative embodiment of the invention shown in the drawing, the capacitor is contained in a generally cylindrical insulating housing 1, which may be made of glass or other suitable rigid insulating material. The housing is closed at the ends by ends caps 2 and 3, which may be made of a molded insulating material. The housing is sealed by means of gaskets 4, disposed in annular recesses in the end caps in which the ends of the housing 1 engage.

The capacitor is sectionalized and consists of a plurality of sections each consisting of a group of individual capacitor elements 5. The capacitor elements 5, sometimes also called sections, are preferably wound capacitor elements of any suitable or usual type, although other types of capacitor elements might be used. The capacitor elements 5 may consist of metal foils separated by a suitable dielectric material, preferably a material such as polytetrafluoroethylene which has low dielectric losses at high-frequency and stable characteristics. The capacitor elements may be made in the usual manner, the metal foils and dielectric material being interleaved and wound on a mandrel, after which the mandrel is removed and the wound capacitor element flattened to the shape shown in the drawing.

The capacitor elements 5 are disposed in a stack in the housing and divided into the desired number of groups or sections. The particular capacitor shown in the drawings has three sections, 6, 7 and 8, although it will be obvious that more or less than three sections might be provided. The sections are separated by insulating plates, a plate 9 being disposed between the sections 6 and 7, and a plate 10 between the sections 7 and 8. The plates may be made of any suitable rigid insulating material, and are provided with openings adjacent their peripheries for the passage of the clamping means described below. A similar insulating plate 11 is disposed at the outer side of the section 6 and an insulating plate 12 is placed at the outer side of the section 8.

The three sections 6, 7 and 8 of the capacitor are held together under pressure by means of clamping members, which apply pressure to the plates to clamp the sections under a desired clamping pressure, which can be individually adjusted to adjust the capacitance of the sections. The clamping means includes four elongated threaded studs 13, 14, 15 and 16, which extend through the insulating plates 9 and 11. These studs also extend through openings in the end cap 2 to the outside of the capacitor, the openings being sealed by means of gaskets 17 and metal bushings 18. Nuts 19 are threaded on the ends of the studs to compress the gaskets and retain the end cap in place. Nuts 20 are threaded on the clamping studs 13, 14, 15 and 16 within the housing, bearing against the insulating plate 11, and internally threaded sleeves or elongated nuts 21 are threaded on the studs bearing against both sides of the insulating plate 9. The ends of the studs within the housing are threaded into similar elongated nuts 22, which bear against the insulating plate 10. Short screws 23 extend through the plate 10 from the other side, and are threaded into the nuts 22, as shown, the screws 23 being retained in place by a thin insulating plate 24 placed against the plate 10.

Similar short screws 25 extend through the plate 10 in the opposite direction, and are held in place by a thin insulating plate 26 placed against the plate 10. The short screws 25 are threaded into internally threaded sleeves or elongated nuts 27 on the right hand side of the insulating plate 10. Four threaded clamping studs 28, 29, 30 and 31 are provided at the right hand end of the capacitor extending through the insulating plate 12, and threaded into the elongated nuts 27. These last-mentioned clamping studs extend through holes in the end cap 3, the holes being sealed by gaskets 32 and bushings 33, and nuts 34 are threaded on these studs within the housing bearing against the insulating plate 12.

It will be seen that by suitably manipulating the nuts 20, 21, 22, 27 and 34, the clamping pressure applied to the sections of the capacitor can be individually adjusted, thus adjusting the capacitance, so that each section can be individually adjusted very accurately to the desired capacitance, and this adjustment will be accurately maintained after it is once made. The clamping studs also clamp the entire assembly tightly together, thus providing a simple and effective construction.

As previously indicated, it is desirable in capacitors of this type to provide for separate electrical connection to each of the sections to permit the tuning of the wave trap to be changed by changing the connections of the capacitor. This result is accomplished by utilizing the conducting clamping studs to obtain electrical connection to the individual sections. The capacitor elements 5 of each section are connected together in any desired manner by strap connectors 35 soldered or otherwise connected to the terminals of the individual capacitor elements. One end of the section 6 is connected to the clamping stud 14 by means of a conductor 36, which is soldered to one of the strap connectors 35 and to the clamping stud, and the other end of the section 6 is similarly connected by a conductor 37 to the clamping stud 13. The conductors 36 and 37 are preferably wrapped around the studs for several turns, as shown in the drawing, to permit rotation of the studs during assembly and adjustment of the capacitor without disturbing the connection. The section 7 is connected on the opposite side of the assembly by a conductor 38 to the clamping stud 15, and by a conductor 39 to the clamping stud 16, or to the nuts which are in contact with the studs. Since the studs 13, 14, 15 and 16 extend through the end cap 2, and are insulated from each other by the end cap and by the insulating plates 9, 10 and 11, the outer ends of these studs conveniently serve as terminals for the sections 6 and 7 and permit separate electrical connection to these sections.

The section 8 is connected by conductors 40 and 41 to the clamping studs 30 and 29, which extend out through the end cap 3 at the other end of the capacitor, so that their outer ends serve as terminals for the section 8. It will be seen that two additional terminal studs 28 and 31 remain, which could be used to provide terminals for a fourth section of the capacitor, if such a section were provided. Thus, individual electrical connection to the sections of the capacitor is provided in a very convenient manner by using the clamping studs themselves for this purpose.

The housing 1 is preferably filled, and the capacitor elements 5 impregnated, with a suitable dielectric liquid 42, such as oil, or other insulating liquid having low high-frequency losses. The housing may be filled with the liquid 42 through a central opening in the end cap 2, which is closed after the housing is filled by means of a stud 43, and an external oil plug 44, which close and seal the opening. Suitable mounting holes 45 may be provided in the end caps 2 and 3, or, if desired, any other suitable means for mounting the capacitor might be provided.

It should now be apparent that a sectionalized capacitor has been provided in which the capacitance can be very accurately adjusted to the desired value by adjusting the clamping pressure on each of the sections individually, so that very close capacitance tolerances can be met. The particular structure shown provides a relatively simple means of doing this, and also provides for individual electrical connection to the sections in a simple and convenient manner. A particular construction has been shown and described for the purpose of illustration, but it will be apparent that various modifications may be made within the scope of the invention, and the invention is not limited to the specific details of construction shown, but includes all equivalent embodiments and modifications.

I claim as my invention:

1. A capacitor comprising an insulating housing, insulating end caps closing the ends of the housing, a plurality of capacitor elements disposed in the housing and connected together in a plurality of groups, insulating spacer members separating said groups, a plurality of conducting clamping members engaging the spacer members and extending through the end caps, and means for electrically connecting different groups of capacitor elements to different ones of the conducting members.

2. A capacitor comprising an insulating housing, insulating end caps closing the ends of the housing, a plurality of capacitor elements disposed in the housing and connected together in a plurality of groups, insulating plates between and at each side of said groups of capacitor elements, a plurality of conducting members for clamping the capacitor elements between the insulating plates, means for individually adjusting the clamping pressure on each group of capacitor elements, and means for electrically connecting different groups of capacitor elements to different ones of said clamping members to effect separate connection to each group.

3. A capacitor comprising an insulating housing, insulating end caps closing the ends of the housing, a plurality of capacitor elements disposed in the housing and connected together in a plurality of groups, insulating plates between and at each side of said groups of capacitor elements, conducting clamping members engaging said plates for clamping the capacitor elements between the plates, means for individually adjusting the clamping pressure on each group of capacitor elements, the clamping members extending through the end caps, and means for electrically connecting different groups of capacitor elements to different ones of the clamping members.

4. A capacitor comprising an insulating housing, insulating end caps closing the ends of the housing, a plurality of capacitor elements disposed in a stack in the housing and connected together in a plurality of groups, insulating plates disposed between said groups and at the ends of the stack of capacitor elements, a plurality of threaded clamping members extending longitudinally of the stack of capacitor elements, each of said clamping members engaging a plurality of said insulating plates and extending through one of the end caps, means on the clamping members for applying pressure to the plates to clamp the capacitor elements between the plates, said pressure-applying means being adjustable for individually adjusting the clamping pressure on each group of capacitor elements, and means for electrically connecting different groups of capacitor elements to different ones of the clamping members.

5. A capacitor comprising an insulating housing, insulating end caps closing the ends of the housing, a plurality of capacitor elements disposed in a stack in the housing and connected together in a plurality of groups, insulating plates disposed between said groups and at the ends of the stack of capacitor elements, a plurality of threaded clamping members extending longitudinally of the stack of capacitor elements, each of said clamping members extending through a plurality of said insulating plates and extending through one of the end caps, nuts on the clamping members engaging the plates for clamping the capacitor elements between the plates, whereby the clamping pressure on each group of capacitor elements is individually adjustable, and means for electrically connecting each group of capacitor elements to a different pair of clamping members.

References Cited in the file of this patent

UNITED STATES PATENTS

| 1,938,792 | Bailey | Dec. 12, 1933 |
| 1,959,372 | Lane | May 22, 1934 |

FOREIGN PATENTS

| 562,945 | France | May 26, 1925 |
| | 2nd addition No. 29,630 | |